(12) United States Patent
Torre

(10) Patent No.: US 6,277,911 B1
(45) Date of Patent: Aug. 21, 2001

(54) TRANSPARENT, COLORLESS, AMORPHOUS COPOLYAMIDES AND MOLDED ARTICLES MADE THEREFROM

(75) Inventor: Hans Dalla Torre, Domat/EMS (CH)

(73) Assignee: EMS Inventa AG, Zurich (CH)

( * ) Notice: Subject to any disclaimer, the term of this patent is extended or adjusted under 35 U.S.C. 154(b) by 0 days.

(21) Appl. No.: 09/467,004

(22) Filed: Dec. 20, 1999

Related U.S. Application Data

(63) Continuation-in-part of application No. 08/936,552, filed on Sep. 24, 1997, now Pat. No. 6,008,288, which is a continuation-in-part of application No. 08/555,790, filed on Nov. 9, 1995, now Pat. No. 5,696,202.

(30) Foreign Application Priority Data

Feb. 1, 1995 (CH) .......................................... 270/95
Sep. 19, 1995 (EP) .................................. 95114719

(51) Int. Cl.$^7$ ............................. C08L 77/06; C08G 69/26
(52) U.S. Cl. ......................... 524/606; 524/538; 525/432; 528/335; 528/346
(58) Field of Search ............................. 524/606; 525/432; 528/346

(56) References Cited

U.S. PATENT DOCUMENTS

| | | |
|---|---|---|
| 2,512,606 | 6/1950 | Bolton et al. . |
| 2,696,482 | 12/1954 | Pease . |
| 3,597,400 | 8/1971 | Kashio et al. . |
| 4,207,411 | 6/1980 | Shue . |
| 4,847,356 * | 7/1989 | Hoppe et al. .................. 528/346 |
| 5,696,202 * | 12/1997 | Torre ............................. 524/606 |

FOREIGN PATENT DOCUMENTS

| | | |
|---|---|---|
| 1 595 354 | 3/1970 | (DE) . |
| 29 34 541 | 4/1981 | (DE) . |
| 37 28 334 | 3/1988 | (DE) . |
| 37 17 928 | 5/1988 | (DE) . |
| 43 10 970 | 10/1994 | (DE) . |
| 0 050 742 | 3/1982 | (EP) . |
| 0 069 700 | 1/1983 | (EP) . |

* cited by examiner

*Primary Examiner*—Tae H. Yoon
(74) *Attorney, Agent, or Firm*—Browdy and Neimark

(57) ABSTRACT

Colorless, amorphous, transparent copolyamides, their blends or alloys, and molded articles with high alternate bending strengths that can be produced from them. The copolyamides are preferably made of cycloaliphatic diamines combined with aliphatic dicarboxylic acids and small amounts of aromatic dicarboxylic acids. The copolyamides exhibit high strength, high rigidity, high heat distortion, and good solvent resistance.

13 Claims, No Drawings

TRANSPARENT, COLORLESS, AMORPHOUS COPOLYAMIDES AND MOLDED ARTICLES MADE THEREFROM

CROSS-REFERENCE TO RELATED APPLICATIONS

The present application is a continuation in part of application Ser. No. 08/936,552 filed Sep. 24, 1997 now U.S. Pat. No. 6,008,288, which is a continuation in part of application Ser. No. 08/555,790, filed Nov. 9, 1995 now U.S. Pat. No. 5,696,202, the entire contents of both of which are hereby incorporated.

FIELD OF THE INVENTION

The present invention relates to transparent, colorless and amorphous polyamides and blends or alloys thereof with homopolyamides, and molded articles made therefrom.

BACKGROUND OF THE INVENTION

European patents EP 50 742 and EP 69 700, and U.S. Pat. Nos. 2,696,482; 3,597,400; 4,207,411; and 4,369,305, all describe amorphous polyamides made from aliphatic diamines and/or 4,4'-diaminocyclohexylmethane (PCAM) and aromatic dicarboxylic acids. Unfortunately, these polyamides have inadequate tenacity and transparency, and they are not colorless.

Polyamides described in U.S. Pat. No. 2,512,606 and published German Patent Disclosure Application DE-OS 29 34 541, which are made from aliphatic dicarboxylic acids and unsubstituted cycloaliphatic diamines with a high proportion of trans-trans isomer are inadequately resistant to stress cracking in boiling water and alcohols to be commercially useful. Additionally, some of these polymers are cloudy.

Polyamides disclosed in German Patent Disclosure DE 43 10 970 require an especially high proportion of trans-trans isomer of from 35 to 60% of the 4,4'-diaminodicyclohexylmethane, which is attained only by means of special reaction conditions, including with expensive distillative fractionation in producing the diamine. These diamines are thus considerably expensive. They are commercially available under the trade names PCAM 50(R) (DuPont, Wilmington, Del.) and Wondamin(R) (New Japan chemical Corporation, Osaka). Dicycan(R), from BASF, an unsubstituted bis(4-aminocyclohexyl)methane, has similar high trans-trans isomer proportions. While these diamines can be used to prepared polyamides with satisfactory tenacity, their resistance to bending stress and their lack of dimensional stability under elevated temperatures makes shaped articles made form them inadequate for certain applications, such as filter bowls for use under high temperature ranges.

German Patent Disclosure DE 15 95 354 describes a process for preparing crystal-clear polyamides from dicarboxylic acids and a defined isomer mixture of bis(aminocyclohexyl)-propane, which can contain up to 80% caprolactam.

However, this patent expressly mentions that those polyamides that contain dodecanoic acid as the carboxylic acid are subject to clouding.

German Patent Disclosure DE 37 17 928 covers transparent copolyamides of preferably aromatic dicarboxylic acids containing the isomers, no longer available, of bis(4-amino-3-methyl-5-ethylcyclohexyl)methane, which have insufficiently high Tg values. German Patent Disclosure DE 37 28 334 discloses blends of copolyamides of aromatic dicarboxylic acids and a mixture of hexamethylene diamine and PACM. Although these latter copolyamides have modified impact strength, they again have low Tg values.

SUMMARY OF THE INVENTION

It is an object of the present invention to overcome the aforesaid deficiencies in the prior art.

It is another object of the present invention to provide polyamide molding compositions which are transparent, colorless, and amorphous.

It is another object of the invention to provide polyamide molding compositions which have sufficient resistance to stress and dimensional stability under elevated temperatures.

According to the present invention, transparent, colorless, amorphous copolyamides and their blends or alloys are provided wherein the copolyamides are made of:

(A) at least one alkyl-substituted cycloaliphatic diamine having from 14 to 22 carbon atoms; and at least one unbranched aliphatic dicarboxylic acid having from 7 to 14 carbon atoms, together with at least one aromatic dicarboxylic acid wherein said at least one aromatic dicarboxylic acid is present in an amount of no more than 20 mol %;

wherein said copolyamide or blend or alloy optionally contains processing and/or usage dictated additives, and wherein said copolyamides have relative solution viscosity of more than 1.6 and wherein said further polyamides are selected from the group consisting of homopolyamides and transparent copolyamides. The present invention is also directed to and molded articles made therefrom.

In particular, the copolyamides, as well as blends and alloys, of at least one aliphatic homopolyamide or amorphous copolyamide with the copolyamides, are those in which preferably long-chain aliphatic monomer units are combined with cycloaliphatic monomer units having at least one cyclohexane ring. As a result of this combination, the copolyamides so produced exhibit extremely high alternating bending strength as well as high tenacity, high rigidity, high resistance to heat distortion under elevated temperatures, and good solvent resistance.

These transparent, amorphous, colorless copolyamides are made substantially from (a) alkyl-substituted cycloaliphatic diamines, preferably those with from 14 to 22 carbon atoms, which are combined with long-chain unbranched aliphatic dicarboxylic acids that have from 7 to 36 carbon atoms, preferably from 8 to 14 carbon atoms, whereby some of the long-chain unbranched aliphatic dicarboxylic acids are replaced with small proportions of aromatic dicarboxylic acids, preferably a maximum of 20 mol % and especially preferably a maximum of 10 mol % thereof.

The term alkyl-substituted cycloaliphatic diamines is understood to mean those diamines that have one or more alkyl substituents, such as methyl, ethyl, propyl, and isobutyl radicals, on at least one cyclohexane ring.

Surprisingly, it has been found that, especially, the transparent copolyamides made up of octanedioic acid, nonanedioic acid, decanedioic acid, undecanedioic acid, or dodecanedioic acid and said cyclic diamines, alone or in blends or mixtures or alloys with further polyamides, are suitable for producing molded articles that are highly ductile, extraordinarily resistant to alternate bending, and which are nevertheless rigid and have high resistance to heat distortion and resistance to stress cracking in alcohol, ketones, and hot water.

Other preferred colyamides are prepared from at least one diamine selected from the group consisting of:

2,2-bis-(4-aminocyclohexyl)-propane 2,6-bis-(aminomethyl)-norbornane 3-aminomethyl-3,5,5-trimethylcyclohexylamine bis-(4-aminomethylcyclohexyl)

bis-(4-aminocyclohexyl)methane diaminomethyl-tricyclodecane 1,3-bis(aminomethyl)-dicyclohexane bis-(4-amino-3methyl-2-ethylcyclohexyl)methane bis-(4-amino-3,5-diethylcyclohexyl)-methane 2,2-bis-(3-methyl-4-aminocyclohexyl)-propane 4,4'-bis(aminomethyl)-dicyclohexane Especially preferred are those copolyamides in which the at least one long chain unbranched aliphatic dicarboxylic acid is replaced by up to about 20 mol % of at least one aromatic dicarboxylic acid.

The resulting copolyamides exhibit advantageously high Tg values, high tensile strengths, and high tensile E-moduli.

Polyamides according to the present invention can be prepared by conventional processes under pressure in autoclaves or in reaction extruders at temperatures that are preferably above 260° C.

Blends or alloys with further homopolyamides or amorphous copolyamides are prepared by conventional processes known to those skilled in the art.

Further homopolyamides advantageously used in the present invention are preferably selected from the group consisting of polyamide 69, polyamide 610, polyamide 612, polyamide 912, polyamide 1212, polyamide 11, polyamide 12, polyamide 3,31-dimethyl-4,4'-diaminocyclohexylmethane 12, polyamide bis-(3-methyl-4-aminocyclohexyl)methane isophthalic acid, polyamide bis-(3-methyl-4-aminocyclohexyl)methane terephthalic acid, polyamide bis-(p-aminocylohexyl)methane 12, polyamide bis-(p-aminocylohexyl)methane isophthalic acid, polyamide bis-(p-aminocylohexyl)methane terephthalic acid, polyamide 2,2-bis-(p-aminocyclohexyl)propane 12, polyamide 2,2-bis-(p-aminocyclohexyl)propane isophthalic acid, polyamide 2,2-bis(p-aminocyclohexyl)propane terephthalic acid, polyamide isophorone diamine 12, polyamide isophorone diamine terephthalic acid, polyamide diaminomethyl-norbornane 12 and polyamide diaminomethyl-tricyclodecane 12; or at least one further amorphous copolyamide selected from the group consisting of polyamide 12/bis-(3-methyl-4-aminocyclohexyl)methane isophthalic acid, polyamide 12/bis-(3-methyl-4-aminocyclohexyl)methane isophthalic acid/3,3'-dimethyl-4,4'-diaminodicyclohexylmethane terephthalic acid, 12/polyamide diaminomethyl-tricyclodecane isophthalic acid, 12/polyamide diaminomethyl phthalic norbornane isophthalic acid, polyamide 12/bis-(p-aminocyclohexyl)methane isophthalic acid, polyamide 12/bis-(p-aminocyclohxyl)propane isophthalic acid, and polyamide 12/isophorone diamine isophthalic acid.

For purposes of the present invention, the polyamides can be designated by a number corresponding to the number of carbon atoms in the starting material, as shown in Table 1.

TABLE 1

Designation of linear aliphatic polyamides of general formula
—[NH—(CH$_2$)$_x$—CO]$_n$—

| Symbol | Value of x | Number of C atoms in the starting material |
|---|---|---|
| PA6 | 5 | 6 |
| PA11 | 10 | 11 |
| PA12 | 11 | 12 |

Where the polyamide homopolymers are built up from one starting material with amino groups plus one starting material with carboxylic acid groups, the polyamides are designated by a two-digit, three-digit, or four-digit number, respectively, as shown in Table 2.

TABLE 2

Designation of linear aliphatic polyamides of general formula
—[NH—(CH$_2$)—NH—CO—(CH$_2$)$_y$—CO]$_n$—

| | value of | |
| Symbol | x | y |
|---|---|---|
| PA 66 | 6 | 4 |
| PA 610 | 6 | 8 |
| PA 612 | 6 | 10 |
| PA 69 | 6 | 7 |
| PA 1212 | 12 | 10 |

Starting materials for the polyamides and copolyamides of the present invention include monomer units derived from the substances listed, together with their designations, in Table 3.

TABLE 3

Symbols of non-linear aliphatic monomer units

| Symbol of monomer unit | Monomer unit derived from |
|---|---|
| T | Terephthalic acid (CAS No. 100-21-0) |
| I | Isophtalic acid (CAS No. 121-95-5) |
| N | 2,6-Naphthalenedicarboxylic acid (CAS No. 1141-38-4) |
| PACP | 2,2-Bis(p-aminocyclohexyl)propane (CAS No. 3377-24-0) |
| MACM | 3,3'-Dimethyl-4,4'-diaminodicyclohexylmethane (CAS No. 6864-37-5) |
| PACM | Bis(p-aminocyclohexyl)methane (CAS No. 1761-71-3) |
| IPD | Isphorone diamine (CAS No. 2855-13-2) |
| ND | 1,6-Diamino-2,2,4-trimethylhexane (CAS No. 3236-53-1) |
| IND | 1,6-Diamino-2,4,4-trimethylhexane (CAS No. 3236-54-2) |
| MC | 1,3-Bis(aminomethyl)cyclohexane (CAS No. 2579-20-6) |
| –12 X | Dodecane, dioic acid |
| 36 | Diomeric fatty acid hydrogenated (CAS No. 668783-41-5) |

Note - The designations ND and IND are derived from the chemical names nonyldiamine and isononyldiamine to avoid having to include numbers in the designations.

Copolyamides, blends, and alloys can optionally contain additives preferably from the group of lubricants, UV and heat stabilizers, chain length regulators, pigments, colorants, impact strength modifiers, flame retardants, and reinforcing agents. Preferred reinforcing agents include glass, minerals, fibers, and fillers.

The present invention also encompasses molded articles that can be made from the copolyamides, blends or alloys according to the present invention.

Molded articles of the present invention are distinguished not only by very high alternate bending strengths, which are documented over at least 600,000 and preferably more than 800,000 alternate bending cycles (measured at 23° C. with dry test bars, 4 mm thick, in accordance with DIN 53442), but also at the same time by notched impact strengths of at least 10 and preferably 12 $KJ/m^2$ at 23° C., and high heat distortion resistance under elevated temperatures as a consequence of Tg values of over 175° C., with excellent resistance to stress cracking in most solvents.

This combination of important properties is made possible by the high molecular weights or by the high (eta relative) solution viscosities of the polyamides of the present invention, which are higher than 1.6 when measured in 0.5% concentration in m-cresol. Transparent, colorless, amorphous polyamides with these properties have not been described thus far in the prior art.

DETAILED DESCRIPTION OF THE INVENTION

The following examples are intended to explain but not to limit the concept of the invention.

EXAMPLE 1

A pressure autoclave of 130 liters volume was rinsed with nitrogen gas and charged with 11,200 g of dodecanedioic acid, 2000 grams isophthalic acid, 14,700 grams of 2,2-bis-(4-aminocycylohexyl)propane, 30 grams of $H_3PO_2$ (50% water solution), 150 grams benzoic acid, and 10 liters of demineralized water. The sealed autoclave was slowly heated under stirring up to 180° C. for 1.5 hours, and then to 280° C. over a three hour period. After pressurizing, depressurizing, and degassing, the product was removed from the vessel and extruded to form a transparent polyamide strand which was passed through a cold water bath and a granulator. The transparent granules were dried at 110° C. under a vacuum of $10^{-1}$ Torr.

The granules had the following properties:
GRANULES ANALYSIS:

| Color | Visual | clear, transparent |
|---|---|---|
| Endgroups | $NH_2/COOH/\mu\ddot{A}g/g$ | 65/52 |
| Solution Viscosity | 0.5% m-Cresol | 1.68 |
| Glasspoint, TG | (DSC) | 173° C. |
| HDT/A | dry/cond. | 130/128° C. |
| HDT/B | dry/cond. | 150/146° C. |

MECHANICAL PROPERTIES:

| Impact Strength | dry, 23° C. | $kJ/m^2$ | n.br |
|---|---|---|---|
| Notched impact strength | dry, 23° C. | $kJ/m^2$ | 8.5 |
| Tensile strength at yield | dry, cond., 23° C. | $N/mm^2$ | 74/66 |
| Elongation at yield | dry, cond., 23° C. | % | 10/10 |
| Tensile strength at break | dry, cond., 23° C. | $N/mm^2$ | 52/48 |
| Elongation at break | dry, cond., 23° C. | % | 70/112 |
| Tensile E-modulus | dry, cond., 23° C. | $N/mm^2$ | 1720/1810 |
| Alternating stress load (according DIN 53442) | dry, 23° C. | cycles | 1,450,000 |

EXAMPLE 2

A pressure autoclave as used in Example 1, above, was rinsed with nitrogen gas and charged with 11,200 grams dodecanedioic acid, 2000 grams terephthalic acid, 7350 grams Laromin $C_{250}$ [bis-(3-methyl-4-aminocyclohexyl)methane], 5260 grams isophoronediamine (3-aminomethyl-3,5,5-trimethylcyclohexylamine), 30 grams $H_3PO_2$ (50% water solution) 150 grams benzoic acid, and 15 liters of demineralized water. The autoclave was sealed and slowly heated to 185° C. for 1.5 hours and then to 285° C. for three hours. After pressurization, depressurization, and degassing, the product was removed from the vessel and extruded to form a transparent polyamide strand. This strand was passed through a cold water bath and granulated. The granules were dried at 100° C. under a $10^{-1}$ Torr vacuum.

The granules had the following properties:
GRANULES ANALYSIS:

| Color | Visual | pale yellow, fully transparent |
|---|---|---|
| Endgroups | $NH_2/COOH/\mu\ddot{A}g/g$ | 60/50 |
| Solution viscosity | 0.5% m-Cresol | 1.70 |
| Glasspoint, TG | DSC | 166° C. |
| HDT/A | dry/cond. | 125/120° C. |
| HDT/B | dry/cond. | 145/140° C. |

MECHANICAL PROPERTIES:

| Impact Strength | dry, 23° C. | $kJ/m^2$ | n.br |
|---|---|---|---|
| Notched impact strength | dry, 23° C. | $kJ/m^2$ | 7.5 |
| Tensile strength at yield | dry, cond., 23° C. | $N/mm^2$ | 74/68 |
| Elongation at yield | dry, cond., 23° C. | % | 7/6 |
| Tensile strength at break | dry, cond., 23° C. | $N/mm^2$ | 58/52 |
| Elongation at break | dry, cond., 23° C. | % | 65/105 |
| Tensile E-modulus | dry, cond., 23° C. | $N/mm^2$ | 1790/1850 |
| Alternating stress load (according DIN 53442) | dry, 23° C. | cycles | 1,160,000 |

EXAMPLE 3

Example 2 was repeated using the same monomers except that in place of Laromin $C_{250}$ and isophoronediamine was used 13,440 grams 4,4-bis-(aminomethyl)dicyclohexane. The polyamide strand produced was transparent and was cut in a granulator into chips The chips were dried at 100° C. in a $10^{-1}$ Torr vacuum. The chips had the following properties:
GRANULES ANALYSIS:

| Color | dried | transparent |
|---|---|---|
| Endgroups | $NH_2/COOH/\mu\ddot{A}g/g$ | 65/52 |
| Solution viscosity | 0.5% m-Cresol | 1.62 |
| Glasspoint, TG | DSC | 158° C. |

| Impact Strength | dry, 23° C. | $kJ/m^2$ | n.br |
|---|---|---|---|
| Notched impact strength | dry, 23° C. | $kJ/m^2$ | 6.5 |
| Tensile strength at yield | dry, cond., 23° C. | $N/mm^2$ | 70/64 |
| Elongation at yield | dry, cond., 23° C. | % | 816 |
| Tensile strength at break | dry, cond., 23° C. | $N/mm^2$ | 55/48 |
| Elongation at break | dry, cond., 23° C. | % | 64/100 |
| Tensile E-modulus | dry, cond., 23° C. | $N/mm^2$ | 1700/1780 |
| Alternating stress load (according DIN 53442) | dry, 23° C. | cycles | 1,200,000 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention. Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. A transparent, colorless, amorphous copolyamide or blends or alloys thereof with at least one further polyamide, wherein the copolyamide is made from at least one alkyl-substituted cycloaliphatic diamine having from 14 to 22 carbon atoms selected from the group consisting of 2,6-bis (aminomethyl)-norbornane; 3-aminomethyl-3,5,5-triemthylcyclohexylamine; bis-(4-aminomethylcyclohexyl); diaminomethyl-tricyclodecane; 1,3-bis-(aminomethyl)-dicyclohexane; bis-(4-amino-3-methyl-2-2-ethylcyclohexyl)-methane; bis-(4-amino-3,5-diethylcyclohexyl)-methane; 2,2-bis-1,4-bis-(aminomethyl)-dicyclohexane;

and at least one unbranched aliphatic dicarboxylic acid having 7 to 14 carbon atoms, together with at least one aromatic dicarboxylic acid, which aromatic dicarboxylic acid is present in an amount of not more than 20 mol %, wherein the copolyamides have relative solution viscosity of more than 1.6;

wherein said at least one further polyamide is selected from the group consisting of homopolyamides and transparent copolyamides;

and wherein standardized test specimens made from said copolyamide of blend or alloy thereof have an alternate bending strength of more than 600,000 cycles at 23° C.

2. The copolyamide according to claim 1 wherein said test specimens have an alternative bending strength of more than 1,200,000 cycles at 23° C.

3. A composition consisting essentially of a blend or alloy of a copolyamide according to claim 1 and at least one further polyamide which is a homo- or a copolyamide selected from the group consisting of polyamide 69, polyamide 610, polyamide 612, polyamide 912, polyamide 1212, polyamide 11, polyamide 12, polyamide 3,3'-dimethyl-4,4'-diaminocyclohexylmethane 12, polyamide bis-(3-methyl-4-aminocyclohexyl)methane isophthalic acid, polyamide bis-(3-methyl-4-aminocyclohexyl)methane terephthalic acid, polyamide bis-(p-aminocyclohexyl)methane 12, polyamide bis-(p-aminocyclohexyl)methane isophthalic acid, polyamide bis-(p-aminocyclohexyl)methane terephthalic acid, polyamide 2,2-bis-(p-aminocyclohexyl)propane isophthalic acid, polyamide 2,2-bis-p-(aminocyclohexyl) propane 12, polyamide 2,2-bis-(p-aminocyclohexyl)propane terephthalic acid, polyamidisophorone diamine 12, polyamide isophorone diamine terephthalic acid, polyamide diaminomethylnorbornane 12 and polyamide diaminomethyltricyclodecane 12; or at least one further amorphous copolyamide selected from the group consisting of polyamide 12/bis-(3-methyl-4-aminocyclohexylmethane isophthalic acid, polyamide 12/bis-(3-methyl-4-aminocyclohexyl)methane isophthalic acid/3,3'-dimethyl-4,4'-diaminodicyclohexylmethane terephthalic acid, polyamide 12/-bis-(aminomethyl)cyclehexylmethane isophthalic acid, polyamide 12/bis-(p-aminocyclohexyl propane) isophthalic acid, polyamide 12/diaminomethyltricyclodecane isophthalic acid, polyamide 12/isophoronediamine isophthalic acid, and polyamide isophorone 12/diaminomethylnorbornane isophthalic acid.

4. A composition comprising the copolyamide according to claim 1 and at least one additive selected from the group consisting of lubricants, heat and UV stabilizers, chain regulators, pigments, colorants, impact strength modifiers, flame retardants, reinforcing agents, and fillers.

5. A copolyamide according to claim 1 wherein said at least one aromatic dicarboxylic acid is present in an amount of 10 mol % to 20 mol %.

6. The copolyamide according to claim 1 wherein said unbranched aliphatic dicarboxylic acid is heptanedioic acid, octanedioic acid, nonanedioic acid, decanedioic acid, undecanedioic acid, or dodecanedioic acid.

7. A copolyamide according to claim 1 wherein the aromatic dicarboxylic acid is terephthalic acid, isophthalic acid, or 2,6-naphthalenedicarboxylic acid.

8. A molded article prepared from the copolyamide of claim 1 or a blend or alloy thereof with at least one polyamide.

9. A molded article prepared from the copolyamide of claim 2 or a blend or alloy thereof with at least one polyamide.

10. A molded article prepared from the composition of claim 3.

11. A molded article prepared from the composition of claim 4.

12. A molded article prepared from the copolyamide of claim 5 or a blend or alloy thereof with at least one polyamide.

13. A molded article prepared from the copolyamide of claim 6 or a blend or alloy thereof with at least one polyamide.

* * * * *